United States Patent
Cooper et al.

(10) Patent No.: US 9,181,497 B2
(45) Date of Patent: Nov. 10, 2015

(54) PROCESS, METHOD, AND SYSTEM FOR REMOVING MERCURY FROM FLUIDS

(71) Applicants: Russell Evan Cooper, Fairfield, CA (US); Dennis John O'Rear, Petaluma, CA (US); Darrell Lynn Gallup, Meridian, ID (US); Lyman Arnold Young, Oakland, CA (US); Sujin Yean, Houston, TX (US)

(72) Inventors: Russell Evan Cooper, Fairfield, CA (US); Dennis John O'Rear, Petaluma, CA (US); Darrell Lynn Gallup, Meridian, ID (US); Lyman Arnold Young, Oakland, CA (US); Sujin Yean, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 271 days.

(21) Appl. No.: 13/895,754

(22) Filed: May 16, 2013

(65) Prior Publication Data

US 2013/0306311 A1   Nov. 21, 2013

Related U.S. Application Data

(60) Provisional application No. 61/648,061, filed on May 16, 2012.

(51) Int. Cl.
| | |
|---|---|
| *E21B 43/34* | (2006.01) |
| *E21B 43/243* | (2006.01) |
| *B01D 53/64* | (2006.01) |
| *C10G 21/08* | (2006.01) |
| *E21B 43/40* | (2006.01) |

(52) U.S. Cl.
CPC ............... *C10G 21/08* (2013.01); *E21B 43/34* (2013.01); *E21B 43/40* (2013.01); *B01D 53/64* (2013.01); *B01D 2257/602* (2013.01); *C10G 2300/201* (2013.01)

(58) Field of Classification Search
CPC ..... E21B 43/2401; E21B 43/243; E21B 21/00; E21B 21/08; E21B 43/26; B01D 2257/602; B01D 53/64
See application file for complete search history.

(56) References Cited

U.S. PATENT DOCUMENTS

| | | |
|---|---|---|
| 3,083,764 A | 4/1963 | Gaskell et al. |
| 3,873,581 A | 3/1975 | Fitzpatrick et al. |
| 4,028,236 A | 6/1977 | Townsend et al. |
| 4,094,098 A | 6/1978 | Gourley |
| 4,094,777 A | 6/1978 | Sugier et al. |
| 4,108,769 A | 8/1978 | Krieg et al. |
| 4,133,755 A | 1/1979 | Tarao et al. |
| 4,149,598 A | 4/1979 | Christian |
| 4,151,077 A | 4/1979 | Nogueira et al. |
| 4,167,481 A | 9/1979 | Cremers et al. |
| 4,230,486 A | 10/1980 | Capuano et al. |
| 4,336,237 A | 6/1982 | Kudryk et al. |
| 4,338,288 A | 7/1982 | Rollmann |

(Continued)

OTHER PUBLICATIONS

Pending U.S. Appl. No. 12/109,194, filed Apr. 24, 2008.

(Continued)

*Primary Examiner* — Zakiya W Bates (57) ABSTRACT

Trace amount levels of non-volatile mercury in crude oil are reduced by contacting the crude oil with a water stream containing at least a monatomic water-soluble sulfur species such as sulfides and hydrosulfides. The non-volatile mercury is extracted into the water phase forming a mercury rich wastewater, yielding a treated crude oil having at less than 50% of the original non-volatile mercury level. The wastewater can disposed or recycled by injection into a reservoir. In one embodiment, the water stream consists essentially of produced water.

28 Claims, 4 Drawing Sheets

(56) References Cited

U.S. PATENT DOCUMENTS

| | | | |
|---|---|---|---|
| 4,354,942 | A | 10/1982 | Kaczur et al. |
| 4,551,237 | A | 11/1985 | Fenton |
| 4,578,195 | A | 3/1986 | Moore et al. |
| 4,619,744 | A | 10/1986 | Horton |
| 4,678,584 | A | 7/1987 | Elfline |
| 4,708,853 | A | 11/1987 | Matviya et al. |
| 4,709,118 | A | 11/1987 | Yan |
| 4,752,397 | A | 6/1988 | Sood |
| 4,876,025 | A | 10/1989 | Roydhouse |
| 4,877,515 | A | 10/1989 | Audeh |
| 4,880,527 | A | 11/1989 | Audeh |
| 4,902,662 | A | 2/1990 | Toulhoat et al. |
| 4,915,818 | A | 4/1990 | Yan |
| 4,981,577 | A | 1/1991 | Audeh et al. |
| 4,985,389 | A | 1/1991 | Audeh |
| 5,034,203 | A | 7/1991 | Audeh et al. |
| 5,037,552 | A | 8/1991 | Furuta et al. |
| 5,107,060 | A | 4/1992 | Yan |
| 5,110,480 | A | 5/1992 | Yan |
| 5,173,286 | A | 12/1992 | Audeh |
| 5,202,301 | A | 4/1993 | McNamara |
| 5,238,488 | A | 8/1993 | Wilhelm |
| 5,304,693 | A | 4/1994 | Boitiaux et al. |
| 5,336,835 | A | 8/1994 | McNamara |
| 5,360,632 | A | 11/1994 | Johnson et al. |
| 5,407,009 | A | 4/1995 | Butler et al. |
| 5,961,821 | A | 10/1999 | Varadaraj et al. |
| 6,268,543 | B1 | 7/2001 | Sakai et al. |
| 6,350,372 | B1 | 2/2002 | Degnan et al. |
| 6,403,044 | B1 | 6/2002 | Litz et al. |
| 6,475,451 | B1 | 11/2002 | Leppin et al. |
| 6,521,131 | B1 | 2/2003 | Hamilton et al. |
| 6,685,824 | B2 | 2/2004 | Frankiewicz et al. |
| 6,866,048 | B2 | 3/2005 | Mattox |
| 6,906,398 | B2 | 6/2005 | Yeo et al. |
| 6,960,291 | B2 | 11/2005 | Greaney et al. |
| 7,037,474 | B2 | 5/2006 | Nolan et al. |
| 7,093,655 | B2 | 8/2006 | Atkinson |
| 7,591,944 | B2 | 9/2009 | Carnell et al. |
| 7,666,318 | B1 | 2/2010 | Lehtinen et al. |
| 7,744,763 | B2 | 6/2010 | Cross et al. |
| 7,775,278 | B2 | 8/2010 | Willberg et al. |
| 2005/0263739 | A1 | 12/2005 | Mattox et al. |
| 2006/0048646 | A1 | 3/2006 | Olson et al. |
| 2007/0246426 | A1 | 10/2007 | Collins |
| 2008/0196892 | A1 | 8/2008 | Lau et al. |
| 2008/0283470 | A1 | 11/2008 | Gustafsson et al. |
| 2009/0114247 | A1 | 5/2009 | Brown et al. |
| 2009/0261040 | A1 | 10/2009 | Pruet |
| 2009/0288825 | A1 | 11/2009 | Tang |
| 2009/0304563 | A1 | 12/2009 | Harada et al. |
| 2009/0308609 | A1 | 12/2009 | Curole et al. |
| 2010/0000910 | A1 | 1/2010 | Gallup et al. |
| 2010/0025184 | A1 | 2/2010 | Shibuya et al. |
| 2010/0032344 | A1 | 2/2010 | Cross et al. |
| 2010/0032345 | A1 | 2/2010 | Cross et al. |
| 2010/0078358 | A1 | 4/2010 | Tullos et al. |
| 2010/0089584 | A1* | 4/2010 | Burns ............... 166/302 |
| 2010/0099596 | A1 | 4/2010 | Trahan |
| 2010/0126909 | A1 | 5/2010 | Bhasin et al. |
| 2010/0147742 | A1 | 6/2010 | Ozum |
| 2010/0155330 | A1 | 6/2010 | Burba et al. |
| 2010/0175896 | A1 | 7/2010 | Owen |
| 2010/0200477 | A1 | 8/2010 | Varadi et al. |
| 2010/0320124 | A1 | 12/2010 | Zhang et al. |
| 2011/0163008 | A1 | 7/2011 | Zhang et al. |
| 2011/0253375 | A1 | 10/2011 | Jamaluddin et al. |
| 2012/0073811 | A1 | 3/2012 | Mock |

OTHER PUBLICATIONS

Pending U.S. Appl. No. 12/132,475, filed Jun. 3, 2008.
Pending U.S. Appl. No. 12/167,466, filed Jul. 3, 2008.
Pending U.S. Appl. No. 12/883,578, filed Sep. 16, 2010.
Pending U.S. Appl. No. 12/883,921, filed Sep. 16, 2010.
Pending U.S. Appl. No. 12/883,971, filed Sep. 16, 2010.
Pending U.S. Appl. No. 12/883,995, filed Sep. 16, 2010.
Pending U.S. Appl. No. 12/950,060, filed Nov. 19, 2010.
Pending U.S. Appl. No. 12/950,170, filed Nov. 19, 2010.
Pending U.S. Appl. No. 12/950,637, filed Nov. 19, 2010.
Pending U.S. Appl. No. 13/299,436, filed Nov. 16, 2011.
Pending U.S. Appl. No. 13/804,172, filed Mar. 14, 2013.
Pending U.S. Appl. No. 13/804,430, filed Mar. 14, 2013.
Pending U.S. Appl. No. 13/804,662, filed Mar. 14, 2013.
Pending U.S. Appl. No. 13/826,213, filed Mar. 14, 2013.
Pending U.S. Appl. No. 13/895,612, filed May 16, 2013.
Pending U.S. Appl. No. 13/895,850, filed May 16, 2013.
Pending U.S. Appl. No. 13/895,983, filed May 16, 2013.
Pending U.S. Appl. No. 13/896,242, filed May 16, 2013.
Pending U.S. Appl. No. 13/896,255, filed May 16, 2013.
Ashworth, S. C., "Mercury Removal at Idaho National Engineering and Environmentally Laboratory's New Waste Calciner Facility," *Waste Management*, Feb. 27-Mar. 2, 2000, INEEL, Bechtel BWXT Idaho, LLC, Tucson, AZ, pp. 1-20.
Campanella et al., "Mercury Removal from Petrochemical Wastes," *Water Research*, 1986, vol. 20, No. 1, pp. 63-65.
Carnell et al., "Mercury Matters," *Hydrocarbon Engineering*, Dec. 2005, 3 pages.
Chaiyasit et al., "Decontamination of Mercury Contaminated Steel (API 5L-X52) Using Iodine and Iodide Lixiviant," *Modern Applied Science*, Jan. 2010, vol. 4, No. 1, pp. 12-20.
Clever et al., "The Solubility of Mercury and Some Sparingly Soluble Mercury Salts in Water and Aqueous Electrolyte Solutions," *Journal of Physical and Chemical Reference Data*, 1895, vol. 14, No. 3, pp. 631-680.
Corvini et al., "Mercury Removal from Natural Gas and Liquid Streams," *UOP LLC*, 2002, Houston, TX, pp. 1-9.
Findlay et al., "Removal of Elemental Mercury from Wastewaters Using Polysulfides," *Environmental Science and Technology*, Nov. 1981, vol. 15, No. 11, pp. 1388-1390.
Gildert et al., "Mercury Removal from Liquid Hydrocarbons in Ethylene Plants," *AIChE Paper No. 135c*, Mar. 24, 2010, Spring National Meeting, San Antonio, TX, 14 pages.
Kim et al., "Demulsification of Water-In-Crude Oil Emulsions by a Continuous Electrostatic Dehydrator," *Separation Science and Technology*, 2002, vol. 37, No. 6, pp. 1307-1320.
Larson et al., "Mass-Transfer Model of Mercury Removal from Water via Microemulsion Liquid Membranes," *Industrial & Engineering Chemistry Research*, 1994, vol. 33, No. 6, pp. 1612-1619.
Lemos et al., "Demusification of Water-in-Crude Oil Emulsions Using Ionic Liquids and Microwave Irradiation," *Energy Fuels*, 2010, vol. 24, pp. 4439-4444.
Morel et al., "The Chemical Cycle and Bioaccumulation of Mercury," *Annual Review Ecology, Evolution, and Systematics*, 1998, vol. 29, pp. 543-566.
Núñez et al., "Leaching of Cinnabar with HCl-Thiourea Solutions as the Basis of a Process for Mercury Obtention," *Metallurgical Transactions B*, Sep. 1996, vol. 17B, pp. 443-448.
Sharma et al., "Chemical Demulsification of Natural Petroleum Emulsions of Assam (India)," *Colloid & Polymer Science*, 1982, vol. 260, pp. 616-622.
Sizeneva et al., "Applied Electrochemistry and Corrosion Protection of Metals: Mercury Passivation Solutions of Potassium Chloride and Sodium Hydroxide and Hypochlorite," *Russian Journal of Applied Chemistry*, 2009, vol. 82, No. 1, pp. 52-56.
Sizeneva et al., "Inorganic Synthesis and Industrial Inorganic Chemistry: A Study of Mercury Dissolution in Aqueous Solutions of Sodium Hypochlorite," *Russian Journal of Applied Chemistry*, 2005, vol. 78, No. 4, pp. 546-548.
Venkatesan et al., "Removal of Complexed Mercury by Dithiocarbamate Grafted on Mesoporous Silica," *Journal of Radioanalytical and Nuclear Chemistry*, 2003, vol. 256, No. 2, pp. 213-218.

(56) References Cited

OTHER PUBLICATIONS

Waldo, John H., "Some New Water-Soluble Organo-Mercury Compounds," *Water Soluble Organo Compounds*, Mar. 6, 1931, vol. 53, pp. 992-996.

Wasay et al., "Remediation of a Soil Polluted by Mercury with Acidic Potassium Iodide," *Journal of Hazardous Materials*, 1995, vol. 44, pp. 93-102.

Yuan et al., "Fractions and Leaching Characteristics of Mercury in Coal," *Environmental Monitoring and Assessment*, Jan. 6, 2009, vol. 167, pp. 581-586.

Zhao et al., "Removal of Elemental Mercury by Sodium Chlorite Solution," *Chemical Engineering & Technology*, 2008, vol. 31, No. 3, pp. 350-354.

* cited by examiner

PROCESS, METHOD, AND SYSTEM FOR REMOVING MERCURY FROM FLUIDS

CROSS-REFERENCE TO RELATED APPLICATIONS

This application claims benefit under 35 USC 119 of U.S. patent application Ser. No. 61/648,061 with a filing date of May 16, 2012. This application claims priority to and benefits from the foregoing, the disclosures of which are incorporated herein by reference.

TECHNICAL FIELD

The invention relates generally to a process, method, and system for removing mercury from hydrocarbon fluids such as crude oil.

BACKGROUND

Mercury can be present in trace amounts in all types of hydrocarbon streams such as crude oils. The amount can range from below the analytical detection limit to several thousand ppbw (parts per billion by weight) depending on the source.

Methods have been disclosed to remove mercury from liquid hydrocarbon feed, specifically volatile mercury. It has been reported that mercury in crude is primarily in the form of volatile species, e.g., 90% $Hg^0$ and only 10% DMHg. See Wilhelm et al. Energy & Fuels 2006, 20, 180-186 (See Table 5 on page 184) http://pubs.acs.org/doi/pdf/10.1021/ef0501391. In contrast, Tao et al. J. Anal. At. Spectrom., 1998, 13, 1085-1093 http://pubs.rsc.org/en/content/articlepdf/1998/ja/a803369b show in Table 8 that dialkylmercury species out-proportion elemental Hg in condensates and natural gas liquids.

U.S. Pat. No. 4,915,818 discloses a method of removing mercury from liquid hydrocarbons (natural gas condensate) by contact with a dilute aqueous solution of alkali metal sulfide salt, for reaction of the sulfur component with the mercury, where the mercury sulfur compounds precipitate and settle for subsequent recovery as a solid waste. U.S. Pat. No. 6,268,543 discloses a method for removing elemental mercury with a sulfur compound where mercury is removed as a solid. U.S. Pat. No. 6,350,372 discloses the removal of mercury from a hydrocarbon feed upon contact with an oil soluble or oil miscible sulfur compound U.S. Pat. No. 4,474,896 discloses using polysulfide based absorbents to remove elemental mercury ($Hg^0$) from gaseous and liquid hydrocarbon streams.

There are also a number of commercially available processes and products for the removal of (volatile) elemental mercury $Hg^0$ from hydrocarbon streams including but not limited to ICI Synetix' Merespec™ fixed bed absorbents, UOP's HgSIV™ regenerative mercury removal adsorbents, and Johnson Matthey's Puraspec™ and Puracare™ granulated absorbents for the removal of mercury from naphtha and/or gaseous hydrocarbon streams. Adsorption technology does not work well for crude oils and condensates with low levels of mercury, and with primarily non-volatile mercury.

Production of oil and gas is usually accompanied by the production of water. This produced water in some cases is reinjected into the subsurface for disposal, to maintain pressure in the reservoir, or to achieve other beneficial effects. The produced water may consist of formation water (water present naturally in the reservoir), or water previously injected into the formation. As exploited reservoirs mature, the quantity of water produced increases. Produced water is the largest single fluid stream in exploration and production operations.

There is a need for methods for the removal of non-volatile mercury from liquid hydrocarbon streams, and particularly methods wherein produced water can be used/recycled.

SUMMARY OF THE INVENTION

In one aspect, the invention relates to an improved method to treat a crude oil to reduce its mercury concentration. The method comprises: extracting crude oil from the ground via a well with associated natural gas and produced water; separating dissolved natural gas and at least a portion of the produced water from the crude oil; mixing into the crude oil at least a portion of the separated produced water and a water-soluble reagent containing a single sulfur atom selected from the group of water-soluble monatomic sulfur compound selected from the group of sodium hydrosulfide, potassium hydrosulfide, ammonium hydrosulfide, sodium sulfide, potassium sulfide, calcium sulfide, magnesium sulfide, and ammonium sulfide and combinations thereof forming a mixture; extracting at least a portion of the mercury into the water as a soluble compound forming a mercury rich wastewater, separating the wastewater from the crude oil for a treated crude oil having a reduced concentration of mercury, and disposal of the mercury-rich wastewater via reinjection to an underground reservoir. In one embodiment, the water stream consists essentially of produced water. In another embodiment, the wastewater is injected into a gas or oil reservoir. In yet another embodiment, the wastewater is optionally treated before injection into a gas or oil reservoir.

In another embodiment, after separation of the treated crude oil having a reduced concentration of mercury from the mercury-rich wastewater, at least a portion of the mercury-rich wastewater is recycled and combined with the separated produced water and a water-soluble reagent to be contacted with the mercury-containing crude oil. In this way, the mercury-rich wastewater, which still contains unreacted water-soluble sulfur-containing reagent is recycled to reduce the total amount of sulfur-containing reagent required to accomplish removal of mercury from the crude oil. At least a portion of the mercury-rich wastewater is disposed of via reinjection to an underground reservoir.

DETAILED DESCRIPTION

The following terms will be used throughout the specification and will have the following meanings unless otherwise indicated.

"Hydrocarbons" refers to hydrocarbon streams such as crude oils and/or natural gases.

"Produced fluids" refers hydrocarbon gases and/or crude oil. Produced fluids may be used interchangeably with hydrocarbons.

"Crude oil" refers to a hydrocarbon material, including to both crude oil and condensate, which is typically in liquid form. Under some formation conditions of temperature and/or pressure, the crude may be in a solid phase. Under some conditions, the oil may be in a very viscous liquid phase that flows slowly, if at all. Crude, crude oil, crudes and crude blends are used interchangeably and each is intended to include both a single crude and blends of crudes.

"Production well" is a well through which produced fluids are carried from an oil-bearing geological formation to the earth's surface, whether the surface is water or land. Surface facilities are provided for handling and processing the crude from the formation as it arrives on the surface.

"Topside production facility" refers to the surface hardware on an offshore oil platform or connected group of platforms, such as the oil production plant and the drilling rig.

"Injection well" is a well through which at least a treatment agent is passed from the surface facilities into the geological formation. In one embodiment, a well is alternatively employed in a producing and an injection mode. The well is alternatively employed for injecting a material into the formation for some period of time. The process conditions within the well are then adjusted to permit crude to flow into the well, from where it is withdrawn to surface facilities.

"Hydrocarbon material" refers to a pure compound or mixtures of compounds containing hydrogen and carbon and optionally sulfur, nitrogen, oxygen, and other elements. Examples include crude oils, synthetic crude oils, petroleum products such as gasoline, jet fuel, diesel fuel, lubricant base oil, solvents, and alcohols such as methanol and ethanol.

"Heavy metals" refers to gold, silver, mercury, osmium, ruthenium, uranium, cadmium, tin, lead, and arsenic. In one embodiment, "heavy metals" refers to mercury.

"Trace amount" refers to the amount of heavy metals in the crude oil. The amount varies depending on the crude oil source and the type of heavy metal, for example, ranging from a few ppb to up to 60,000 ppb for mercury and arsenic.

"High mercury crude" refers to a crude with 50 ppbw or more of mercury, e.g., 100 ppbw or more of mercury; or 250 ppbw or more of mercury.

"Mercury sulfide" may be used interchangeably with HgS, referring to mercurous sulfide, mercuric sulfide, or mixtures thereof. Normally, mercury sulfide is present as mercuric sulfide with a stoichiometric equivalent of one mole of sulfide ion per mole of mercury ion.

"Percent volatile mercury" in one embodiment is measured by stripping 15 ml of crude or condensate with 300 ml/min of nitrogen ($N_2$) for one hour. For samples which are fluid at room temperature, the stripping is carried out at room temperature. For samples which have a pour point above room temperature, but below 60° C., the stripping is done at 60° C. For samples which have a pour point above 60° C., the stripping is at 10° C. above the pour point.

"Percent particulate mercury" refers to the portion of mercury that can be removed from the crude oil by centrifugation or filtration. After the centrifuging the sample, the mercury concentration is determined for the middle of the hydrocarbon layer. The sample is not taken from sediment, water or rag layers. The sample is not shaken or stirred after centrifugation. In one embodiment, percent particulate mercury is measured by filtration using a 0.45 micron filter or by using a modified sediment and water (BS&W) technique described in ASTM D4007-11. The sample is heated in accordance with the procedure. If the two methods are in disagreement, the modified basic BS&W test is used. The modifications to the BS&W test includes: omission of dilution with toluene; demulsifier is not added; and the sample is centrifuged two times with the water and sediments values measured after each time. If the amount of sample is small, the ASTM D4007-11 procedure can be used with smaller centrifuge tubes, but if there is disagreement, the modified basic BS&W test is used with the centrifuge tubes specified in ASTM D4007-11.

"Hg-particulate crude" refers to a crude that contains 25% or more of its mercury content as particulate mercury.

"Predominantly non-volatile (mercury)" in the context of crudes refers crudes for which less than 50% of the mercury can be removed by stripping, e.g., less than 25% of the mercury can be removed by stripping; or less than 15%.

"Predominantly Hg-particulate crude" refers to a crude for which 50% or more of the mercury is particulate (non-volatile) mercury, e.g., with >65% or more mercury as particulate mercury; with >75% or more mercury as particulate mercury; or with >90% or more mercury as particulate mercury.

"Halogens" refers to diatomic species from the column of the periodic table headed by fluorine, for example $F_2$, $Cl_2$, $Br_2$, $I_2$, etc.

"Halogen oxides" refers to molecules which combine one or more halogen atoms and oxygen, for example NaClO, $ClO_2$, $NaClO_4$.

"Flow-back water" refers to water that flows back to the surface after being placed into a subterranean formation as part of an enhanced oil recovery operation, e.g., a hydraulic fracturing operation.

"Produced water" refers to the water generated in the production of oil and gas, including formation water (water present naturally in a reservoir), as well as water previously injected into a formation either by matrix or fracture injection, which can be any of connate water, aquifer water, seawater, desalinated water, flow-back water, industrial by-product water, and combinations thereof.

The invention relates to systems and processes for the removal of mercury from a crude oil. The system in one embodiment is located at a production facility, wherein produced water is used in the mercury removal process prior to transport. The wastewater containing mercury after the removal process can be injected into an underground facility, e.g., a reservoir.

Crude Oil Feedstock: Mercury can be present in crude oil feed as elemental mercury $Hg^0$, ionic mercury, inorganic mercury compounds, and/or organic mercury compounds. Examples include but are not limited to: mercuric halides (e.g., HgXY, X and Y could be halides, oxygen, or halogen-oxides), mercurous halides (e.g., $Hg_2XY$, X and Y could be halides, oxygen, or halogen-oxides), mercuric oxides (e.g., HgO), mercuric sulfide (e.g., HgS, meta-cinnabar and/or cinnabar), mercuric sulfate ($HgSO_4$), mercurous sulfate ($Hg_2SO_4$), mercury selenide (e.g., $HgSe_2$, $HgSe_8$, HgSe), mercury hydroxides, and organo-mercury compounds (e.g., alkyl mercury compounds) and mixtures of thereof.

Studies have been conducted to measure mercury levels in certain crude oil feedstock as well as the percentage of mercury in the feedstock in the forms of particles or particulate, which can be removed by filtration or centrifugation. It was shown that in these crude oil samples with more than 50 ppbw mercury, the percent mercury in particles which can be removed by laboratory filtration or centrifugation is over 25% with an average of 73%. It is believed that the remaining 27% mercury is primarily in the form of fine particles. It was also shown that in these samples of crude oils and condensates, the predominant form of mercury is non-volatile, and not in the form of volatile elemental mercury $Hg^0$ as indicated in the prior art, which can be readily removed from hydrocarbons upon stripping or sparging with a low mercury gas stream.

The invention relates to the removal of trace mercury in crude oil that contains predominantly particulate or non-volatile mercury, referring to crudes containing mercury of which less than 50% of the mercury can be removed by stripping (or more than 50% of the mercury is particulate) in one embodiment; less than 35% of the mercury in the crude can be removed by stripping in a second embodiment; and less than 25% of the mercury in the crude can be removed by stripping in a third embodiment. In the crude, the non-volatile mercury can be present in dissolved form, as particles, and/or adsorbed onto particulate surfaces such as clay minerals, inorganic mineral scale, sand, and asphaltenes and as suspended mercury sulfide.

The crude oil containing small amounts of heavy metals such as mercury has a specific gravity of at least 0.75 at a temperature of 60° F. in one embodiment; at least 0.85 in a second embodiment; and at least 0.90 in a third embodiment. In one embodiment, the crude oil is in the form of a mixture of crude and water produced from a hydrocarbon reservoir, or from a production well. For some sources, the crude stream to be treated may contain little if any produced water. For some other sources, the amount of produced water can be as much as 98% of the crude stream to be treated. Crude oil feed to be treated refers to both crude oil by itself as well as crude oil-water mixtures.

Method for Removing Mercury: The non-volatile mercury in the crude oil is removed by treatment with a treating solution containing at least a water-soluble monatomic sulfur species, e.g., sulfides and hydrosulfides, wherein the non-volatile mercury is extracted into the aqueous phase as soluble mercury complexes and wherein very little or no solid mercury complex, e.g., HgS, is formed. Very little or no solid mercury complex means than less than 1% of the mercury in the crude oil after extraction is in the form of a solid such as HgS in one embodiment; less than 0.10% HgS is formed in a second embodiment; and less than 0.05% HgS in a third embodiment. The percent of solid mercury complexes can be determined by filtration, e.g., through a 0.45 micron (or less) filter.

In one embodiment, the treatment is in-situ in the formation, wherein the treating solution is injected into the formation in the process of water injection or water flooding. Water injection or waterflooding is a widely applied method of improved oil recovery, wherein water is used as the dilution fluid for injecting into the rock formation through a system of injection boreholes to facilitate recovery of hydrocarbons from subsurface formations. In another embodiment, the treatment is in-situ via pipeline reaction, wherein the treating solution is injected into the wellbore, and the reaction for the removal of mercury occurs in the pipeline or borehole of the production well as the crude oil is being extracted.

In one embodiment prior to treatment with a treating solution, the crude oil stream produced from an oil reservoir via a production well prior to treatment is first passed to a separation device for the separation of the crude from dissolved natural gas and at least a portion of the produced water. The separated natural gas can be directed to an absorber/scrubber for the removal of mercury separately.

The treating solution used to remove the non-volatile mercury is formed by combining at least a portion of the produced water with the water-soluble sulfur species, which may be added to the mixture as a concentrated solution in fresh or produced water. Examples of water-soluble monatomic sulfur compounds include sodium hydrosulfide, potassium hydrosulfide, ammonium hydrosulfide, sodium sulfide, potassium sulfide, calcium sulfide, magnesium sulfide, and ammonium sulfide.

After contacting the crude oil with the aqueous solution, the mixture is separated to produce a treated oil containing a reduced concentration of mercury and a mercury-rich wastewater. At least a portion of the mercury rich wastewater is injected into an underground reservoir which may be the same or different from the reservoir from which the crude oil containing mercury was produced. In one embodiment, at least a portion of the mercury-rich wastewater is recycled and combined with produced water and additional sulfur-containing reagent to produce the treating solution for removing mercury from a mercury-containing crude oil.

The monatomic sulfur compound ("additive") can be introduced continuously, e.g., in a water stream being brought into contact continuously with the crude oil stream in a crude processing facility, or intermittently, e.g., the injection of a water stream containing the additive batch-wise into operating gas or fluid pipelines in a crude production facility. The water is non-potable water selected from any of connate water, aquifer water, seawater, desalinated water, oil field produced water, industrial by-product water, or combinations thereof. In one embodiment, the water stream consists essentially of produced water. In one embodiment, the water for use in the removal of mercury is from a water storage/treatment facility connected to the crude processing facility, wherein produced water, seawater, etc., is recovered and prepared with the addition of the monatomic sulfur compound needed for the removal of the heavy metals. The water containing the monatomic sulfur compound may be cold, heated, or at ambient temperature prior to being mixed with the crude oil.

The amount of additive needed for mercury removal is determined by the effectiveness of the monatomic sulfur compound employed. The amount of sulfur used is at least equal to the amount of mercury in the crude on a molar basis (1:1), if not in an excess amount. In one embodiment, the molar ratio ranges from 5:1 to 50:1. In another embodiment, from 10:1 to 25:1. In yet another embodiment, the molar ratio of sulfur additive to mercury ranges from 1.5:1 to 200000:1.

In one embodiment, the additive is added to the crude oil in solution (aqueous form), at a volume ratio of water containing additive to crude oil ranging from 0.05:1 to 5:1 in one embodiment; from 1:1 to 2:1 in a second embodiment; from 0.1:1 to 1:1 in a third embodiment; and at least 0.5:1 in a fourth embodiment. The pH of the water stream or treatment solution containing the additive is adjusted to a pre-selected pH prior to addition to the crude oil to at least 8 in one embodiment; at least 9 in a second embodiment; at least 10 in a third embodiment; and at least 11 in a fourth embodiment. The pH can be adjusted with the addition of amines such as monoethanol amine, ammonia, diethanol amine, or a strong base such as sodium hydroxide, potassium hydroxide, etc. The base can be added concurrently with the additive solution, or separately before or after the addition of the additive to the crude oil, or intermittently in the mixing of the additive and the crude oil.

The contact with the additive for mercury removal is for any period of time of: at least thirty seconds, at least 15 minutes; at least 30 minutes; at least 1 hr.; at least 2 hrs.; at least 4 hours; and at least 12 hours, forming an emulsion which subsequently separates into two phases, a water phase with mercury rich wastewater, and an oil phase with reduced mercury concentration. After the conversion of the non-volatile mercury to the water-soluble form, at least 50% of the non-volatile mercury originally in the crude is extracted into the water phase in one embodiment; at least 75% removal in a second embodiment; at least 80% removal in a third embodiment; at least 90% in a fourth embodiment; and at least 95% in a fifth embodiment. The treated crude stream contains less than 100 ppbw in non-volatile (particulate) mercury in one embodiment, less than 50 ppbw particulate mercury in another embodiment; and less than 10 ppbw in a third embodiment.

The contact between the crude oil and the additive can be either via a non-dispersive or dispersive method. The dispersive contacting method can be via mixing valves, static mixers or mixing tanks or vessels, or other methods known in the art. The non-dispersive method can be any of packed inert particle beds, fiber film contactors, or other method known in the art. The separation of treated crude from the aqueous phase can be carried out by methods known in the art, e.g., gravity settling, coalescing.

In one embodiment, the removal of mercury is carried out in an integrated unit, e.g., a single vessel having a contact zone for crude containing heavy metals to be in intimate contact with the additive, and a settling zone for the separation of the treated crude (with volatile mercury) from water phase. The additive can be mixed with the crude oil prior to entering the contact zone, or injected as a separate stream into the contacting zone. The flow of the additive and the crude oil in the unit can be counter-current or concurrent. In yet another embodiment, the mercury removal is conducted in a single tower with a top section for the mixing of the crude oil with the additive and a bottom section for the separation of the treated crude from the water phase containing the removed mercury. In one embodiment, the top section comprises at least a contactor characterized by large surface areas, e.g., a plurality of fibers or bundles of fibers, allowing mass transfer in a non-dispersive manner.

In one embodiment, the equipment contains at least two contactors comprising fibers in series. The fibers in each contactor are wetted by the additive to form a thin film on the surface of fibers, and present a large surface area to the crude oil to be in contact with the same or different additive (e.g., sulfur-containing reagent). In one embodiment, the admixture of the treated crude oil and the additive exits the bottom of the first contactor and flows into the next contactor in series, wherein additional additive is introduced. The admixture exits the bottom contactor and is directed to a bottom separation section. In one embodiment, the bottom section also comprises fibers to aid with the separation, wherein the mixture of treated crude oil and the aqueous phase flows through the fibers to form two distinct liquid layers, an upper layer of treated crude with reduced mercury content and a lower aqueous phase layer containing dissolved mercury species. Further details regarding the description of examplary treatment units are described in US Patent Publication Nos. US20100200477, US20100320124, US20110163008, US20100122950, and US20110142747; and U.S. Pat. Nos. 7,326,333 and 7,381,309, and the relevant disclosures are included herein by reference.

In one embodiment, the waste water containing extracted mercury after separation can be disposed by pumping it underground into a crude or oil reservoir (in production or depleted). In one embodiment, the waste water after separation is treated prior to disposal, e.g., including the removal of any suspended oil and solids prior to injection. The oil/water separation and water treatment can be carried out using processes and equipment known in the art, including separators, hydroclone, mesh coalescer, filter, membrane, centrifuge and the like for the oil/water separation; ion exchange, electrodialysis, electrodialysis reversal, electrochemical, deionization, evaporation, electro-deionization, reverse osmosis, membrane separation, oxidation reactor, filtration, and combinations thereof.

In one embodiment, the waste water can be treated and regenerated by stripping to liberate the mercury into a vapor stream for removal via adsorption in a conventional gas-phase mercury removal unit. Examples of a stripping gas for include but are not limited to air, $N_2$, $CO_2$, $H_2$, methane, argon, helium, steam, air, natural gas, and combinations thereof. In one embodiment, the stripping gas is a gas that originally contained mercury, such as the natural gas removed from the crude oil before treatment with the aqueous sulfur-containing solution, but from which the mercury has been removed by an Hg adsorbent. In this fashion, a gas can be recycled between the mercury-rich wastewater water and an Hg adsorbent, with mercury in the aqueous phase being transferred to the adsorbent.

The mercury removal methods and equipment described herein may be placed in the same location of a production facility, i.e., subterranean hydrocarbon producing well, or placed as close as possible to the location of the well. In one embodiment, the monatomic sulfur additive is introduced to the oil-water mixture at the well head, for the simultaneous reaction to remove mercury from the crude oil to occur in the pipeline as the material flows to an oil processing facility located at a different location further away. The natural mixing in the pipeline can be augmented with the use of mixers at the point of introduction of the monatomic sulfur additive, or at intervals downstream in the pipeline. Examples include static or in-line mixers. In another embodiment, the monatomic sulfur additive is introduced to the oil-water mixture in the well itself underground.

In another embodiment, the method is employed to remove predominantly non-volatile mercury from crude during refinery processing steps that precede distillation. This reduces or eliminates mercury contamination in distilled products. In yet another embodiment, the mercury removal equipment is placed at an offshore facility for the production of oil and/or natural gas, such as but not limited to a floating production, storage and offloading (FPSO) unit. A FPSO is a floating vessel for the processing of hydrocarbons and for storage of oil. The FPSO unit processes an incoming stream of crude oil, water, gas, and sediment, and produces a shippable crude oil with acceptable properties including levels of heavy metals such as mercury, vapor pressure, basic sediment & water (BS&W) values, etc.

EXAMPLES

The following examples are given to illustrate the present invention. However, that the invention is not limited to the specific conditions or details described in these examples.

Example 1

In this example, a sample of volatile $Hg^0$ in simulated crude was prepared. First, five grams of elemental mercury $Hg^0$ was placed in an impinger at 100° C. and 0.625 SCF/min of nitrogen gas was passed over through the impinger to form an Hg-saturated nitrogen gas stream. This gas stream was then bubbled through 3123 pounds of Supurla® white oil held at 60-70° C. in an agitated vessel. The operation continued for 55 hours until the mercury level in the white oil reached 500 ppbw. The simulated material was drummed and stored.

Example 2

The example illustrates the stripping of volatile elemental Hg from a crude. First, 75 ml of the simulated crude from Example 1 was placed in a 100 ml graduated cylinder and sparged with 300 ml/min of nitrogen at room temperature. The simulated crude had been stored for an extended period of time, e.g., months, and its initial value of mercury had decreased to about 375 ppbw due to vaporization (at time 0). The mercury in this simulated crude was rapidly stripped consistent with the known behavior of elemental Hg, as shown in Table 1, and contained little or any non-volatile (particulate) mercury. The effective level of mercury at 60 minutes and onward is essentially 0 as the detection limit of the mercury analyzed used for this test was 50 ppbw

TABLE 1

| Time, min | Mercury, ppbw |
|---|---|
| 0 | 369 |
| 10 | 274 |
| 20 | 216 |
| 30 | 163 |
| 40 | 99 |
| 50 | 56 |
| 60 | 73 |
| 80 | 44 |
| 100 | 38 |
| 120 | 11 |
| 140 | 25 |
| Pct Volatile Hg | 80 |

Example 3

The example illustrates the removal of mercury from a crude oil sample containing volatile mercury with a sulfur compound in the prior art, $Na_2S_n$ with $n \geq 2$. The crude oil prepared in Example 1 was mixed with aqueous sodium polysulfide in a stirred batch reactor for 90 minutes after initially purging the reactor with nitrogen to remove oxygen. The ratio of oil volume to total volume of liquid in the reactor was 0.5, and concentration of sodium polysulfide in the aqueous phase was 1 wt %, equivalent to 0.57 wt. % sulfur. The mercury concentrations in the oil and aqueous phases were measured. Table 2 shows the mass fraction of mercury remaining in the oil and mercury extracted to the aqueous phase over time, with greater than 90% of the mercury content in the oil was extracted to the aqueous phase. Centrifugation of the aqueous phase after separation from the oil layer did not reduce the mercury concentration, showing that the mercury extracted into water is a dissolved compound, e.g., an ionic species containing mercury and sulfur.

TABLE 2

| Time, min | Mercury balance crude (%) | Mercury balance water (%) | Mercury balance total (%) |
|---|---|---|---|
| 0 | 100 | 0 | 100 |
| 1 | 105 | 15 | 120 |
| 5 | 80 | 41 | 122 |
| 15 | 41 | 84 | 125 |
| 30 | 15 | 124 | 139 |
| 60 | 7 | 137 | 144 |

Examples 4-6

Various samples of crudes from different sources were obtained, analyzed for particulate mercury using the modified BS&W test, and studied in the stripping test. In contrast to the simulated crude which used $Hg^0$, the mercury in these crudes is predominantly non-volatile and contains Hg particles. Crudes 1 & 2 had pour points above room temperature and were stripped at 60° C. Crude 3 was fluid at room temperature and was stripped at room temperature. Table 3 shows the results of the analyses.

TABLE 3

| Example 3 - Crude 1 34% particulate Hg 60° C. | | Example 4 - Crude 2 91% particulate Hg 60° C. | | Example 5 - Crude 3 76% particulate Hg Ambient | |
|---|---|---|---|---|---|
| Time, min | Hg, ppbw | Time, min | Hg, ppbw | Time, min | Hg, ppbw |
| 0 | 444 | 0 | 6130 | 0 | 3361 |
| 10 | 397 | 10 | 6172 | 10 | 3334 |
| 20 | 407 | 20 | 5879 | 20 | 3329 |
| 30 | 405 | 30 | 6653 | 30 | 3539 |
| 40 | 432 | 40 | 6255 | 40 | 3303 |
| 50 | 427 | 50 | 6886 | 50 | 3710 |
| 60 | 398 | 60 | 6420 | 60 | 3539 |
| 80 | 413 | 80 | 6626 | — | — |
| 100 | 460 | — | — | — | — |
| 120 | 427 | | | | |
| 140 | 427 | — | — | — | — |
| 160 | 419 | | | | |
| 180 | 481 | — | — | — | — |
| Volatile Hg % | 10 | Volatile Hg % | 0 | Volatile Hg % | 0 |

Example 7

Equal volumes of Crude 2 (containing particulate or non-volatile mercury) and aqueous solution of sodium polysulfide at 0.7 wt. % concentration (0.43 wt. % sulfur) were mixed at 80° C. for 120 minutes. The mercury concentrations in the oil and aqueous phases were measured. Table 4 shows the mass fraction of mercury remaining in the oil and mercury extracted to the aqueous phase over time, with less than 10% of the mercury in the oil being extracted to the aqueous phase. Disappearance of mercury from the oil phase was attributed to the precipitation of mercury sulfide HgS as a solid and very little mercury was dissolved in the aqueous phase.

TABLE 4

| Time, min | Mercury balance crude (%) | Mercury balance water (%) | Mercury balance total (%) |
|---|---|---|---|
| 0 | 100 | 0 | 100 |
| 1 | 70 | 20 | 90 |
| 5 | 110 | 15 | 125 |
| 15 | 67 | 8 | 75 |
| 30 | 70 | 3 | 73 |
| 60 | 41 | 2 | 43 |
| 90 | 20 | 2 | 22 |
| 120 | 36 | 6 | 42 |

Example 8

The crude oil prepared in Example 1 was mixed with aqueous sodium sulfide ($Na_2S$) at 1.6 wt. % concentration (0.67 wt. % sulfur) in a stirred batch reactor for 90 minutes after initially purging the reactor with nitrogen to remove oxygen. The ratio of oil volume to total volume of liquid in the reactor was 0.65. Table 5 shows the mass fraction of mercury remaining in the oil and mercury extracted to the aqueous phase over time, with less than 50% of the mercury in the oil being extracted to the aqueous phase. The total mercury balance in the test was less than 100%. It is assumed that some of the elemental mercury evaporated or was converted to an insoluble precipitate such as mercury sulfide HgS. As shown, monatomic sulfur compounds were effective in removing at least a portion of volatile (elemental) mercury from crude oil as a dissolved mercury compound in the aqueous phase.

TABLE 5

| Time, min | Mercury balance crude (%) | Mercury balance water (%) | Mercury balance total (%) |
|---|---|---|---|
| 0 | 100 | 0 | 100 |
| 5 | 75 | 22 | 97 |
| 10 | 61 | 28 | 89 |
| 20 | 63 | 31 | 94 |
| 30 | 38 | 24 | 62 |
| 40 | 30 | 35 | 65 |
| 50 | 32 | 46 | 79 |
| 70 | 24 | 42 | 66 |
| 90 | 20 | 45 | 65 |

Example 9

Example 7 was repeated but with sodium sulfide ($Na_2S$) instead of sodium polysulfide. Equal volumes of Crude 2 (containing particulate or non-volatile mercury) and aqueous solution of sodium sulfide at 1 wt. % concentration (0.4 wt. % sulfur) were mixed at 80° C. for 90 minutes. The mercury concentrations in the oil and aqueous phases were measured. Table 6 shows the mass fraction of mercury remaining in the oil and mercury extracted to the aqueous phase over time, with over 80% of the mercury in the oil being extracted to the aqueous phase. As shown, mercury was removed from the crude oil as a water-soluble mercury compound, contrary to the prior art's teaching of removing mercury as a solid precipitate. The removal of mercury as water-soluble mercury compound facilitates the disposal of the mercury via reinjection of the mercury-rich wastewater into to an underground reservoir.

TABLE 6

| Time, min | Mercury balance crude (%) | Mercury balance water (%) | Mercury balance total (%) |
|---|---|---|---|
| 0 | 100 | 0 | 100 |
| 5 | 8 | 72 | 80 |
| 10 | 6 | 79 | 86 |
| 20 | 3 | 80 | 83 |
| 30 | 5 | 83 | 88 |
| 50 | 8 | 90 | 98 |
| 70 | 8 | 94 | 102 |
| 90 | 8 | 83 | 91 |

Example 10

Example 9 was repeated but with sodium hydrosulfide (NaHS). Equal volumes of Crude 2 (containing particulate or non-volatile mercury) and aqueous solution of sodium hydrosulfide at 1.5 wt. % concentration (0.9 wt. % sulfur) were mixed at 60° C. for 90 minutes. The mercury concentrations in the oil and aqueous phases were measured. Table 7 shows the mass fraction of mercury remaining in the oil and mercury extracted to the aqueous phase over time, with over 80% of the mercury initially present in the oil as particulate (non-volatile) mercury being extracted to the aqueous phase. Further, the data shows that sodium hydrosulfide is as effective as sodium hydrosulfide in extraction of mercury from crude oil into the aqueous phase.

TABLE 7

| Time, min | Mercury balance crude (%) | Mercury balance water (%) | Mercury balance total (%) |
|---|---|---|---|
| 0 | 100 | 0 | 100 |
| 5 | 28 | 60 | 88 |
| 10 | 17 | 78 | 95 |
| 20 | 19 | 83 | 100 |
| 30 | 12 | 86 | 98 |
| 50 | 13 | 87 | 100 |
| 70 | 18 | 87 | 105 |
| 90 | 14 | 87 | 101 |

Example 11

Tests were conducted to evaluate the effect of pH on the removal of particulate mercury from crude oil. Equal volumes of Crude 2 (containing particulate or non-volatile mercury) and aqueous solution of sodium hydrosulfide at 0.75 wt. % concentration and varying concentration of NaOH were mixed at 60° C. for 20 minutes. The mercury concentrations in the oil and aqueous phases were measured. Table 8 shows the mass fraction of mercury remaining in the oil and mercury extracted to the aqueous phase over time with a much faster reaction and more mercury removal with increasing concentration of NaOH.

TABLE 8

| NaOH conc. g/L | Time, min | Mercury balance crude (%) | Mercury balance water (%) | Mercury balance total (%) |
|---|---|---|---|---|
| 0 | 0 | 100 | 0 | 100 |
| 0 | 5 | 45 | 40 | 85 |
| 0 | 10 | 38 | 52 | 90 |
| 0 | 20 | 57 | 52 | 109 |
| 0 | 30 | 33 | 58 | 91 |
| 0 | 50 | 30 | 60 | 90 |
| 0 | 70 | 30 | 63 | 93 |
| 0 | 90 | 32 | 62 | 95 |
| 5 | 0 | 100 | 0 | 100 |
| 5 | 5 | 28 | 55 | 82 |
| 5 | 10 | 18 | 63 | 81 |
| 5 | 15 | 18 | 63 | 81 |
| 5 | 25 | 15 | 71 | 86 |
| 5 | 35 | 13 | 71 | 84 |
| 5 | 45 | 13 | 77 | 90 |
| 15 | 0 | 100 | 0 | 100 |
| 15 | 5 | 20 | 89 | 109 |
| 15 | 10 | 17 | 94 | 110 |
| 15 | 15 | 13 | 100 | 113 |
| 15 | 25 | 11 | 103 | 114 |
| 15 | 35 | 11 | 102 | 114 |
| 15 | 45 | 9 | 111 | 120 |

Figures Illustrating Embodiments: Reference will be made to the figures with block diagrams schematically illustrating different embodiments of a mercury removal unit (MRU) and process for the removal of mercury from a crude oil. Notations for the equipment and process lines in the figures as follows (if applicable), with the dotted line in each figure denoting the boundary for the oil processing facility: 1 is oil production well; 2 is the well head; 3 is the oil transfer line/pipeline, which in one embodiment further includes integral mixing devices such as static mixers, etc.; 4 is the oil water separator; 5 is the separated oil; 6 is the contactor; 7 is the separated produced water; 8 is the separated natural gas; 9 is a mercury removal unit (MRU) such as an adsorbent bed; 10 is the natural gas with reduced Hg level; 11 is the mixed oil and sulfide solution; 12 is the separator; 13 is treated crude oil; 14 is separated producer water to contactor; 15 is sulfide feed; 16 is mercury containing solution; 17 is sulfide solution recycle; 18 is sulfide additive concentrate stream; 19 is mercury-containing solution to treatment; 20 is separated produced water to treatment and/or reinjection. In FIG. 4, 21 is a stripping unit with heat input for a temperature in the range of 100-200° C.; 22 is natural gas product; 23 is stripping gas; 24 is stripping gas product; and 25 is stripped sulfide solution for rejection and/or combination with stream 15.

Figure 1:
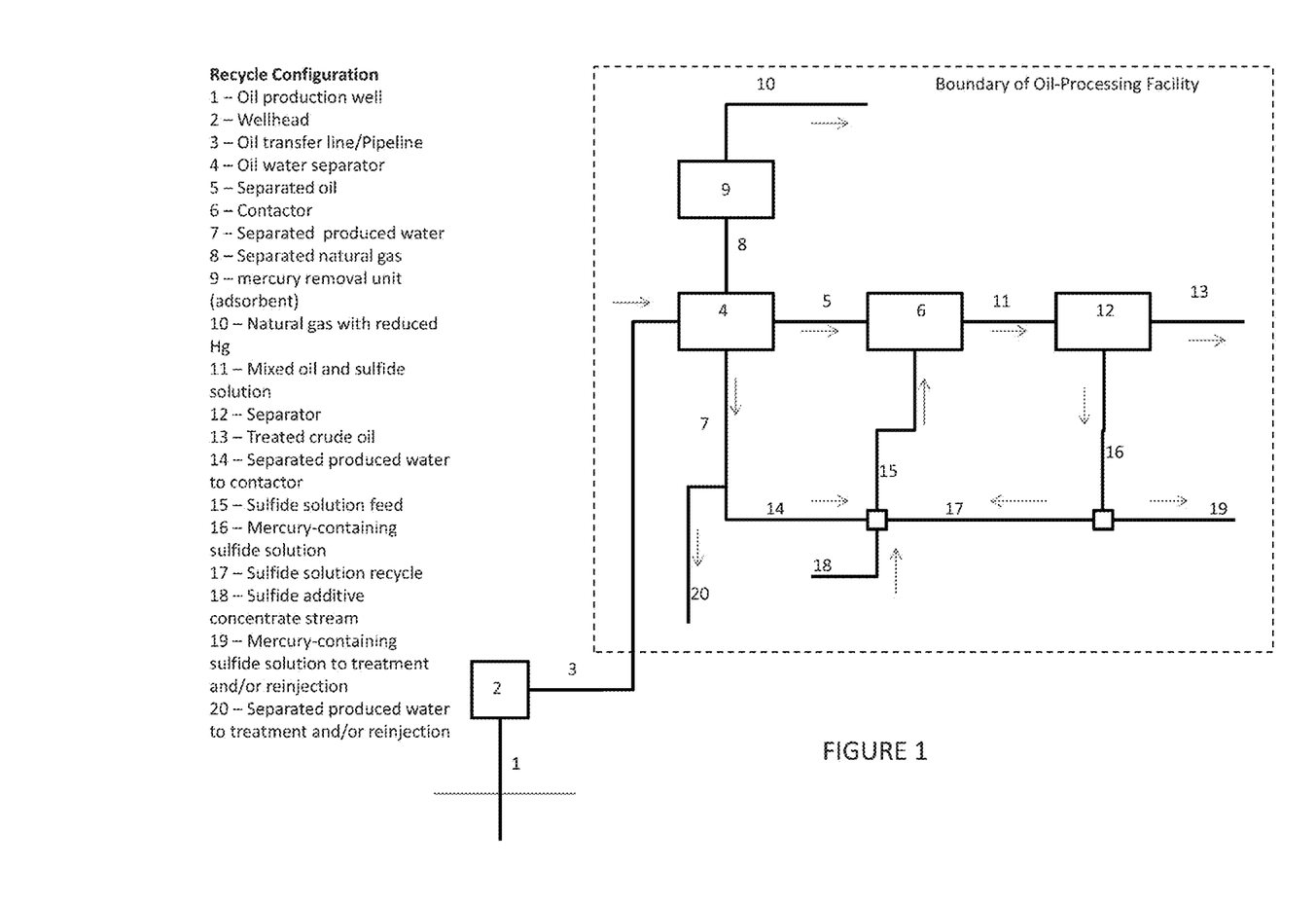
FIG. 1 is a block diagram of an embodiment of a mercury removal unit (MRU) and process to remove mercury from crude oil, wherein the wastewater containing soluble mercury complexes is recycled for use as treatment solution or injected into a reservoir.
Figure 2:
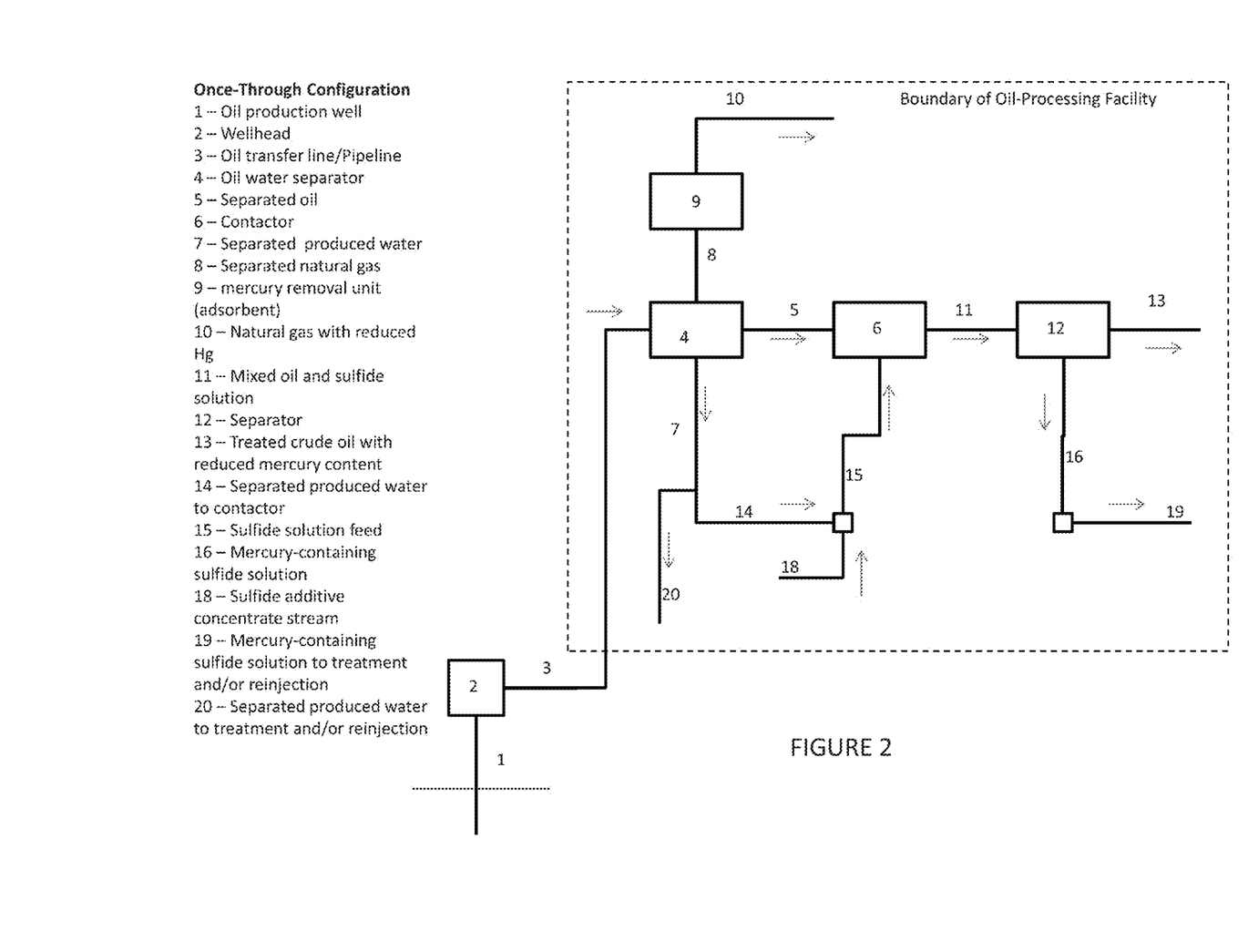
FIG. 2 is a block diagram of another embodiment of the MRU.

FIG. 1 is a block diagram of an embodiment of a system and process to remove mercury from crude oil, wherein the wastewater containing soluble mercury complexes is recycled for use as treatment solution or injected into a reservoir. In FIG. 1, an oil-water mixture with mercury-containing crude oil, is produced from a well 1 and transferred to an oil processing plant. The water in this stream is known as produced water. Before separating the oil and water, a quantity of water-soluble sulfide reagent 15 is added to this mixed oil-water stream. The sulfide reagent 15 may be introduced to the oil-water mixture at a well-head so that contact of the oil with sulfide-containing produced water occurs in a pipeline as the material flows to an oil processing plant. Contact of the oil with sulfide containing produced water may alternatively be carried out in a dedicated mixing device such as in contactor 6. The sulfide reagent extracts mercury from the crude oil to the produced water to create an oil with reduced mercury content. The oil and water are separated by means known in the art such as in separator 12. The separated water containing the sulfide reagent and mercury is routed to a disposal well 19 for reinjection underground. The disposal well may reintroduce the produced water to the same or different reservoir from which the oil and produced water were collected. The disposal well may connect to a reservoir that has previously been depleted of oil thus disposing of the produced water, sulfide reagent, and mercury FIG. 2 is a block diagram of another embodiment of a mercury removal unit (MRU), wherein an oil-water mixture with mercury-containing crude oil, is produced from a well 1 and transferred to an oil processing plant. The oil and produced water are separated by means known in the art. The separated oil is contacted in a mixing device such as contactor 6 with at least a portion of the produced water. A water-soluble sulfide reagent is included in the produced water within the mixing device such that the concentration of the sulfide in the water within the mixing device. Mercury is transferred from the oil and dissolved in the sulfide containing produced water. The oil with decreased mercury content is separated from the produced water by means known in the art, such as separator 12. The separated produced water is recycled back to the mixing device at least a portion of the separated produced water is routed to a reinjection well 19 for disposal of the produced water and mercury. The disposal well may reintroduce the produced water to the same or different reservoir from which the oil and produced water were collected. The disposal well may connect to a reservoir that has previously been depleted of oil thus disposing of the produced water, sulfide reagent, and mercury. The recycle of a portion of the separated produced water enables a reduction in the amount of sulfide reagent required to remove mercury from the crude oil.

Figure 3:
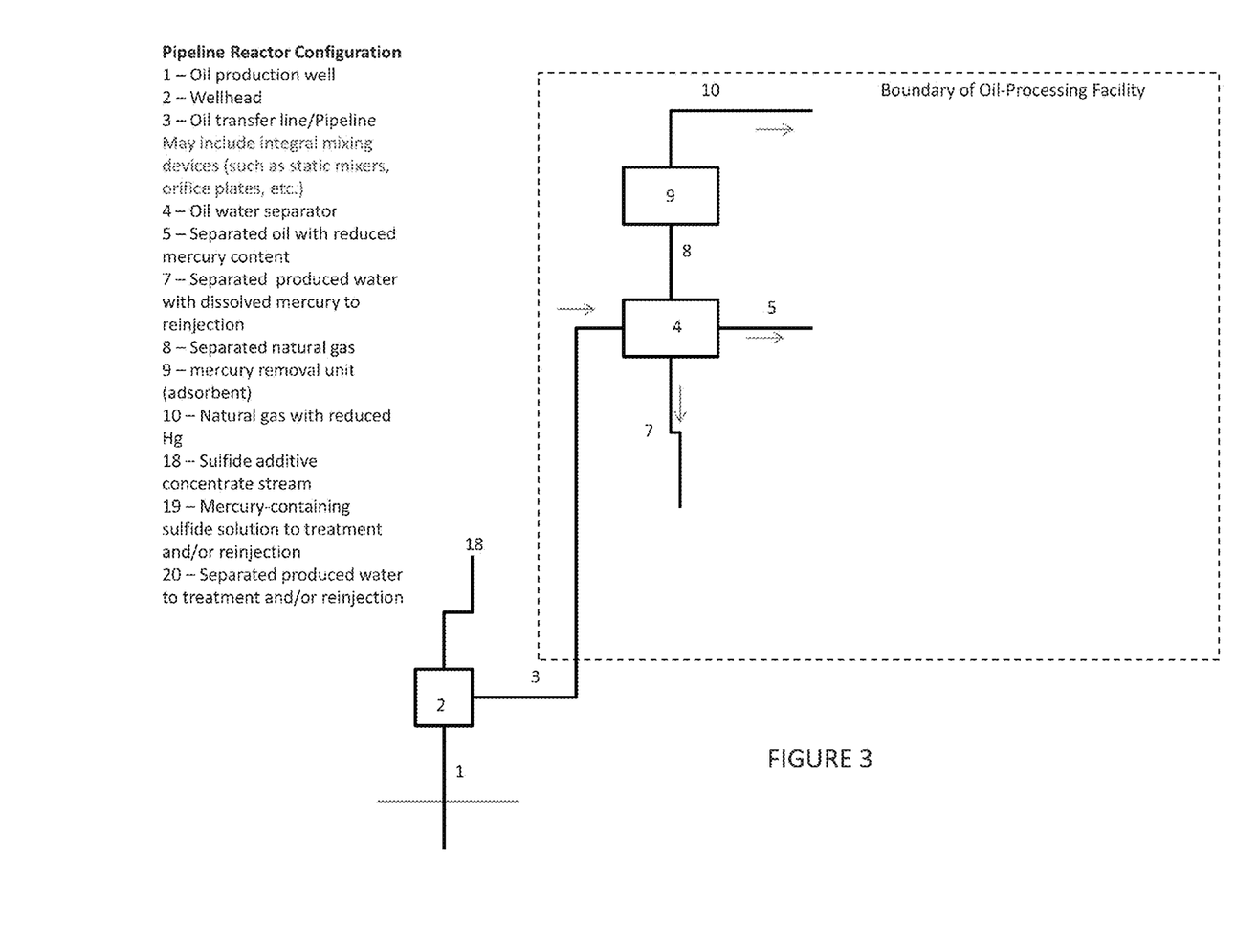
FIG. 3 is a block diagram of yet another embodiment of a process for mercury removal, wherein the removal is in-situ in a pipeline from a production well to a processing facility.
Figure 4:
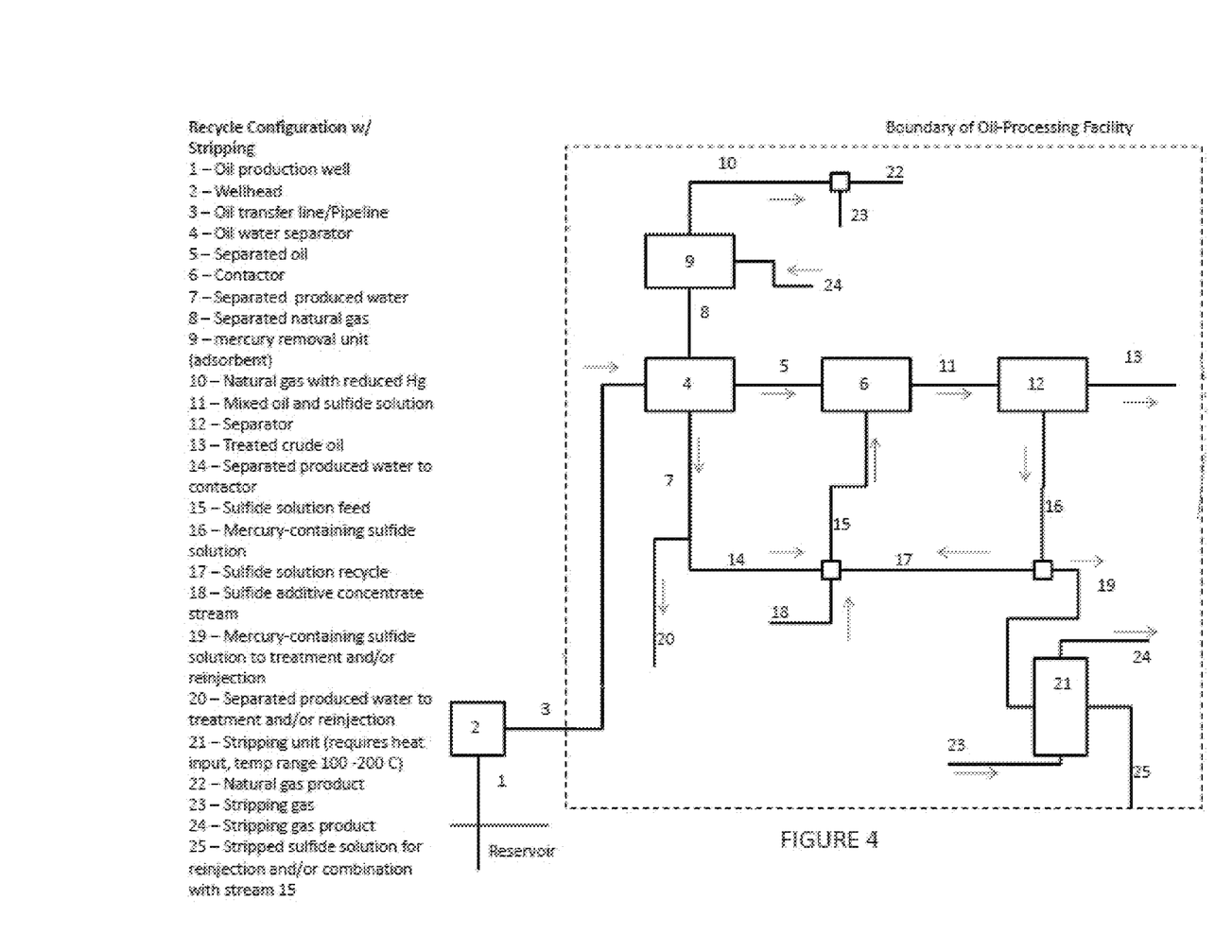
FIG. 4 is a block diagram of yet another embodiment of a process for mercury removal, including equipment for the treatment/removal of mercury from a stripping gas.

FIG. 3 is a block diagram of yet another embodiment of a process for mercury removal, wherein the removal is in-situ in a pipeline from a production well to a processing facility.

FIG. 4 is a block diagram of yet another embodiment of a process for mercury removal, including equipment for the treatment/removal of mercury from a stripping gas.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for removing a trace amount of mercury in a crude oil feed, comprising:
   providing a crude oil having a first concentration of mercury in which at least 50% of the mercury is non-volatile mercury;
   mixing into the crude oil an effective amount of a water stream consisting essentially of at least a water-soluble monatomic sulfur compound selected from the group of sodium hydrosulfide, potassium hydrosulfide, ammonium hydrosulfide, sodium sulfide, potassium sulfide, calcium sulfide, magnesium sulfide, and ammonium sulfide and combinations thereof forming a mixture;
   extracting at least a portion of the non-volatile mercury from the crude oil into water as soluble mercury sulfur complexes forming a mercury rich wastewater; and
   separating the wastewater containing the soluble mercury sulfur complexes from the crude oil for a treated crude oil having a reduced concentration of non-volatile mercury.

2. The method of claim 1, wherein less than 1% of the non-volatile mercury in the crude oil is extracted from the crude oil as a solid mercury complex.

3. The method of claim 1, wherein the water stream consists essentially of produced water.

4. The method of claim 1 further comprising recovering the wastewater after the separating step for injection into an oil or gas reservoir.

5. The method of claim 4, further comprising treating the recovered wastewater after the separating step for discharge in compliance with relevant regulations.

6. The method of claim 1, wherein the at least a water-soluble monatomic sulfur compound is selected from sodium hydrosulfide, sodium sulfide, and mixtures thereof.

7. The method of claim 1, wherein the crude oil has a first concentration of mercury with at least 65% of the mercury is non-volatile mercury.

8. The method of claim 1, wherein at least 50% of the non-volatile mercury is extracted into the water stream to form the mercury-rich wastewater.

9. The method of claim 8, wherein at least 75% of the non-volatile mercury is extracted into the water stream to form the mercury-rich wastewater.

10. The method of claim 1, wherein the water stream containing at least a water-soluble monatomic sulfur compound has a pH of at least 9.

11. The method of claim 1, further comprising adding a sufficient amount of a base to the mixture of crude oil and water stream containing at least a water-soluble monatomic sulfur for the mixture to have a pH of at least 9.

12. The method of claim 1, wherein the treated crude oil contains less than 100 ppbw of non-volatile mercury.

13. The method of claim 12, wherein the treated crude oil contains less than 50 ppbw of non-volatile mercury.

14. The method of claim 1, wherein the water stream contains at least a water-soluble monatomic sulfur compound for a molar ratio of 1.5:1 to 1000:1 of sulfur to mercury in the crude oil.

15. The method of claim 1, wherein mixing into the crude oil an effective amount of water stream containing water-soluble monatomic sulfur compound comprises mixing a volume ratio of water to crude oil ranging from 0.05:1 to 5:1.

16. The method of claim 1, wherein the method is carried out on a floating production, storage and offloading (FPSO) unit.

17. The method of claim 1, wherein the mixing into the crude oil an effective amount of a water stream containing at least a water-soluble monatomic sulfur compound occurs in-situ in the formation where the crude oil is extracted.

18. The method of claim 1, wherein the mixing into the crude oil an effective amount of a water stream containing at least a water-soluble monatomic sulfur compound occurs in a pipeline in the production well from where the crude oil is recovered.

19. A method for reducing a trace amount of mercury in a crude oil feed, comprising:
recovering a mixture of produced water and crude oil containing mercury from an underground reservoir, wherein at least 50% of the mercury is non-volatile mercury;
mixing into the mixture of produced water and crude oil an effective amount of a water stream consisting essentially of a base and at least a water soluble monatomic sulfur compound selected from the group of sodium hydrosulfide, sodium sulfide, potassium hydrosulfide, ammonium hydrosulfide, potassium sulfide, calcium sulfide, magnesium sulfide, ammonium sulfide, and combinations thereof;
extracting at least a portion of the non-volatile mercury into produced water as soluble mercury sulfur complexes forming a mercury rich wastewater;
separating the mercury rich wastewater from the crude oil for a treated crude oil having a reduced concentration of non-volatile mercury; and
injecting at least a portion of the mercury rich wastewater into an underground reservoir.

20. The method of claim 19, wherein the treated crude oil contains less than 100 ppbw of non-volatile mercury.

21. The method of claim 19, wherein the mixing with an effective amount of a water stream containing at least a water-soluble monatomic sulfur compound is for at least 15 minutes.

22. A method for removing a trace amount of mercury from a crude oil feed comprising:
extracting a produced fluid containing natural gas, produced water, and crude oil from an underground reservoir via a production well;
separating at least a portion of dissolved natural gas and produced water from the crude oil in the produced fluid to produce a crude oil containing a trace amount of mercury in which at least 50% of the mercury is non-volatile mercury;
combining at least a portion of the separated produced water with a water stream consisting essentially of at least a water-soluble monatomic sulfur compound to produce a sulfur-containing produced water solution;
contacting the crude oil containing a trace amount of mercury with at least a portion of the sulfur-containing produced water solution for the mercury to react with the sulfur compound forming a soluble mercury sulfur complex in produced water; and
separating the produced water from the crude oil to generate a treated crude oil having a reduced concentration of mercury and a mercury-containing wastewater stream.

23. The method of claim 22, further comprising contacting the mercury-containing wastewater stream with a stripping gas to convert the soluble mercury sulfur complex to elemental mercury for removal with the stripping gas.

24. The method of claim 23, wherein the stripping gas is natural gas having a low mercury content due to prior treatment in a mercury removal adsorbent.

25. The method of claim 23, further comprising passing the stripping gas containing elemental mercury to an adsorbent bed to produce a natural gas having a low mercury content.

26. The method of claim 22, wherein the at least a water-soluble monatomic sulfur compound is selected from sodium hydrosulfide, sodium sulfide, and mixtures thereof.

27. A method for removing a trace amount of mercury from a crude oil feed comprising:
extracting a produced fluid from an underground reservoir via a well;
separating at least a portion of dissolved natural gas and produced water from the crude oil in the produced fluid to produce a crude oil containing a trace amount of mercury in which at least 50% of the mercury is non-volatile mercury;
combining at least a portion of the separated produced water with a water stream consisting essentially of at least a water-soluble monatomic sulfur compound to produce a sulfur-containing produced water solution;
contacting the separated crude oil with at least a portion of the sulfur-containing produced water solution for the monatomic sulfur compound to react with the mercury in the crude oil forming a treated crude oil having a reduced mercury concentration and a mercury-containing wastewater stream containing soluble mercury sulfur compounds;
separating treated crude oil having a reduced mercury concentration from the mercury containing wastewater stream; and
recycling at least a portion of the mercury-containing wastewater stream for use in producing a sulfur-containing produced water solution.

28. The method of claim 27, further comprising contacting the mercury-containing wastewater stream with a stripping gas to convert the soluble mercury sulfur complex to elemental mercury for removal with the stripping gas prior to recycling at least a portion of the wastewater stream for use in producing a sulfur-containing produced water solution.

* * * * *